P. G. KENT & J. M. PARKER.
Loom-Picker Rods.

No. 158,282. Patented Dec. 29, 1874.

WITNESSES
Mary P. Utley.
Geo. E. Upham.

INVENTORS
Prescott G. Kent
Jerome M. Parker,
Chipman Hosmer & Co.
ATTORNEYS

UNITED STATES PATENT OFFICE.

PRESCOTT G. KENT AND JEROME M. PARKER, OF FITCHBURG, MASS.

IMPROVEMENT IN LOOM PICKER-RODS.

Specification forming part of Letters Patent No. 158,282, dated December 29, 1874; application filed December 12, 1874.

*To all whom it may concern:*

Be it known that we, PRESCOTT G. KENT and JEROME M. PARKER, of Fitchburg, in the county of Worcester and State of Massachusetts, have invented a new and valuable Improvement in Loom Picker-Rods, and we do hereby declare that the following is a full, clear, and exact description of the construction and operation of the same, reference being had to the annexed drawings, making a part of this specification, and to the letters and figures of reference marked thereon.

Figure 1:
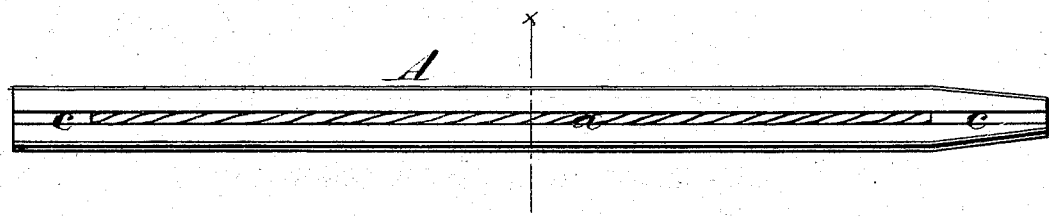
Figure 2:
Figure 3:
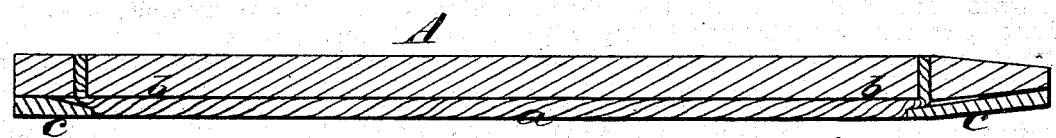

Figure 1 of the drawing is a representation of a top plan view of our device, and Fig. 2 is a transverse sectional view of the same. Fig. 3 is a longitudinal vertical sectional view.

This invention has relation to means for lubricating picker-rods for looms; and it consists in a picker-rod having a deep groove made longitudinally in its periphery, and filled with cotton, wool, hemp, or any other substance which can be saturated with oil.

In the annexed drawings, A designates a loom picker-rod, which is a round rod of steel of suitable diameter and length, having a slot, $b$, extending from one end to the other, or, at least, extending through that portion of it which should be lubricated. The slot $b$ is filled with cotton, wool, hemp, or any other suitable substance which can be saturated with oil, so that as it performs its duty of knocking the shuttle across the web, or from one loom-box to the other, the oil in the filling $a$ will keep the rod lubricated. We are thus able to save a large percentum of the oil commonly used for this purpose, and at the same time to lubricate the parts much more perfectly than hitherto. For the purpose of keeping the ends of the filling $a$ in the groove $b$, I force into the ends of this groove short bits of wood $c$, as shown in Figs. 1 and 3.

What we claim as new, and desire to secure by Letters Patent, is —

The picker-rod A, provided with the groove $b$, adapted to receive a filling, $a$, for holding oil, substantially as described.

In testimony that we claim the above, we have hereunto subscribed our names in the presence of two witnesses.

PRESCOTT G. KENT,
JEROME M. PARKER.

Witnesses:
DAVID JONES,
ALBERT B. CLARKE.